United States Patent
Boroughf

(10) Patent No.: US 11,440,510 B2
(45) Date of Patent: Sep. 13, 2022

(54) DISPOSABLE OIL CHANGE KIT

(71) Applicant: William Boroughf, Novi, MI (US)

(72) Inventor: William Boroughf, Novi, MI (US)

(*) Notice: Subject to any disclaimer, the term of this patent is extended or adjusted under 35 U.S.C. 154(b) by 0 days.

(21) Appl. No.: 17/462,177

(22) Filed: Aug. 31, 2021

(65) Prior Publication Data
US 2021/0394719 A1    Dec. 23, 2021

Related U.S. Application Data

(63) Continuation-in-part of application No. 16/672,388, filed on Nov. 1, 2019, now abandoned, which is a continuation-in-part of application No. 13/538,412, filed on Jun. 29, 2012, now abandoned.

(60) Provisional application No. 61/658,655, filed on Jun. 12, 2012.

(51) Int. Cl.
*F16N 31/00* (2006.01)
*B60S 5/00* (2006.01)

(52) U.S. Cl.
CPC .............. *B60S 5/00* (2013.01); *F16N 31/002* (2013.01); *F16N 31/006* (2013.01)

(58) Field of Classification Search
CPC ............ B65D 81/264; B65F 2240/152; F16N 31/006; F16N 31/002; C09K 3/32
USPC ........... 220/571, 572, 573; 184/106; 296/38; 206/204
See application file for complete search history.

(56) References Cited

U.S. PATENT DOCUMENTS

| | | | | |
|---|---|---|---|---|
| 4,098,398 A | * | 7/1978 | Meyers ................. | B65D 85/00 141/340 |
| 4,823,947 A | * | 4/1989 | Maynard, Jr. ......... | F16N 31/004 141/98 |
| 5,020,638 A | * | 6/1991 | Smith .................... | F16N 31/006 184/106 |
| 5,092,457 A | * | 3/1992 | Islava ................. | F01M 11/0458 229/138 |
| 5,143,178 A | * | 9/1992 | Latham, Jr. ........... | F16N 31/002 141/340 |
| 5,716,840 A | * | 2/1998 | Kahler ..................... | C09K 3/32 435/297.1 |
| 5,763,083 A | * | 6/1998 | Berrigan ................ | C02F 1/681 428/401 |
| 5,972,470 A | * | 10/1999 | Engst ....................... | C09K 3/32 428/140 |
| 6,349,656 B1 | * | 2/2002 | Mitchell ............. | B65D 19/0087 108/901 |

(Continued)

*Primary Examiner* — Jacob K Ackun
(74) *Attorney, Agent, or Firm* — Blue Filament Law PLLC

(57) ABSTRACT

A disposable liquid disposal tool is provided for collecting liquids and for changing engine oil or other hydrocarbon containing products whereby the liquid, spent oil, or hydrocarbon is encapsulated in a non-biodegradable substance rendering the kit safe for disposal in a non-hazard or controlled substance landfill. A disposable container insert tray may be composed of rows separating conical shaped depressions that are used to channel the liquid to all levels of the container so that liquids can be exposed to the maximum volume of the non-biodegradable substance for total encapsulation. In embodiments, the top of the liquid disposal container may be covered with an open weave fabric material that acts as a diffuser whereby the liquid materials are spread more equally throughout the confines of the container and on to the surface of the tray insert.

20 Claims, 16 Drawing Sheets

(56) References Cited

U.S. PATENT DOCUMENTS

| | | | | |
|---|---|---|---|---|
| 6,378,639 B1* | 4/2002 | Murray | F16N 31/006 | 180/69.1 |
| 6,558,769 B1* | 5/2003 | Chwala | B32B 3/266 | 180/69.1 |
| 6,793,092 B1* | 9/2004 | Hayakawa | F16N 31/006 | 220/571 |
| 6,899,940 B2* | 5/2005 | Leriget | E04H 6/428 | 428/68 |
| 6,945,362 B1* | 9/2005 | Sumpter, Sr. | F16N 31/002 | 184/106 |
| 7,737,372 B2* | 6/2010 | Dougherty, Jr. | E02D 31/00 | 73/296 |
| 8,479,945 B1* | 7/2013 | Simmons | B65D 81/262 | 220/571 |
| 2003/0121802 A1* | 7/2003 | MacQuoid | B65D 81/264 | 206/204 |
| 2004/0069571 A1* | 4/2004 | Lee | A01K 1/0107 | 184/106 |
| 2005/0133516 A1* | 6/2005 | Dyer | F16N 31/002 | 220/694 |
| 2008/0099098 A1* | 5/2008 | Henecke | G06F 16/248 | 141/86 |
| 2010/0043717 A1* | 2/2010 | Walker | A01K 1/0114 | 119/167 |
| 2010/0066033 A1* | 3/2010 | Jessberger | F16J 15/064 | 184/106 |
| 2010/0136128 A1* | 6/2010 | Hurwitz | A01K 1/0155 | 424/76.9 |
| 2011/0174740 A1* | 7/2011 | St. Pierre | B01J 20/24 | 210/671 |
| 2011/0253930 A1* | 10/2011 | Pearce, III | B01J 20/106 | 252/184 |
| 2012/0311972 A1* | 12/2012 | Hunter | B65D 65/466 | 220/592.2 |

* cited by examiner

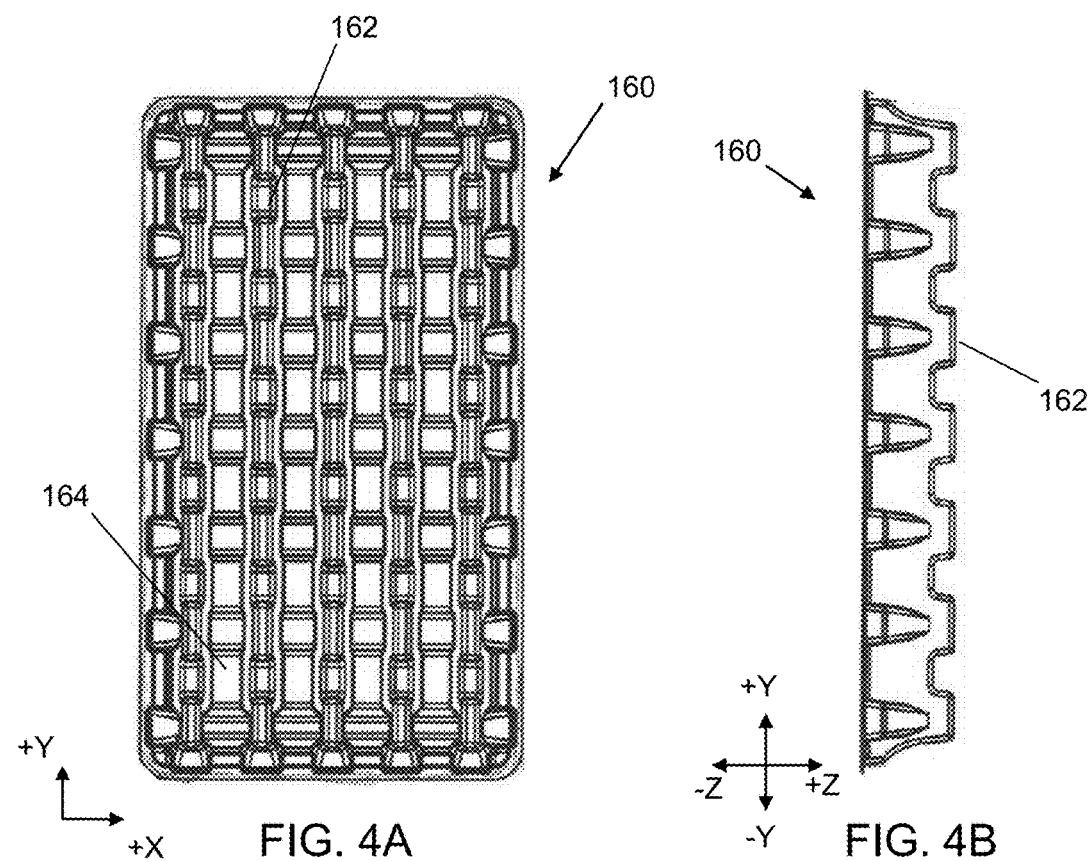
FIG. 4A
FIG. 4B
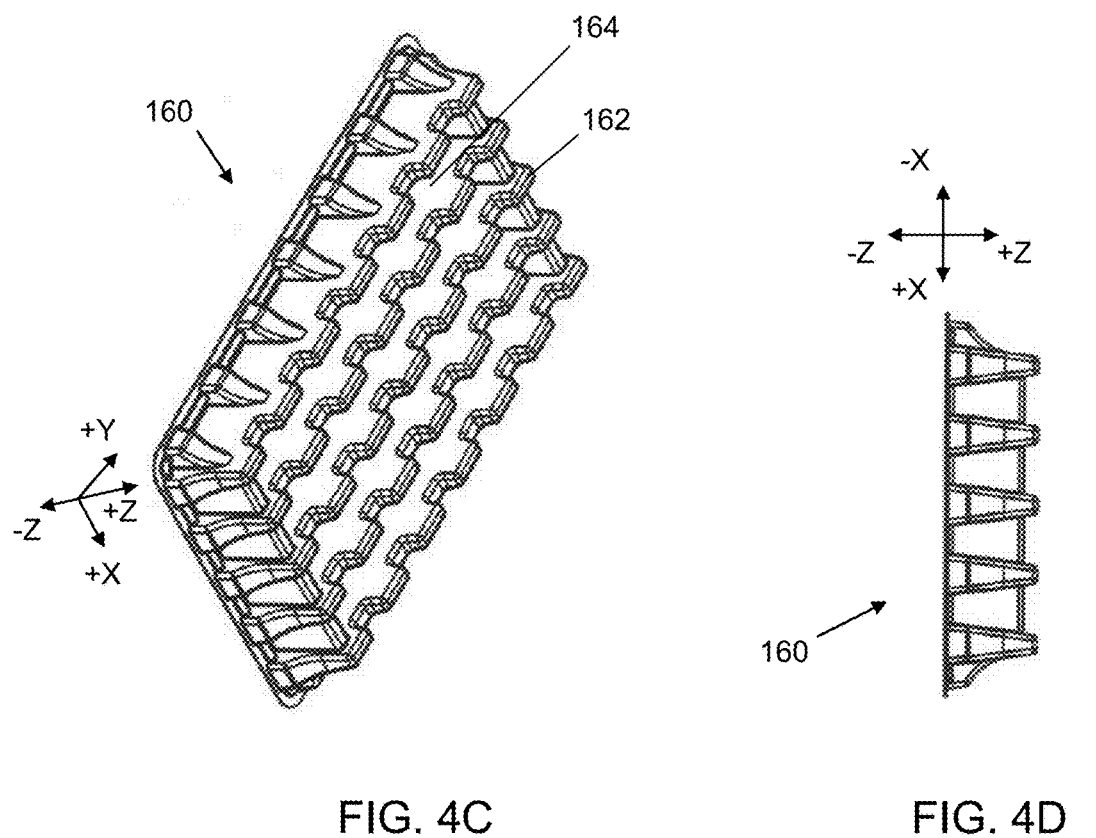
FIG. 4C
FIG. 4D

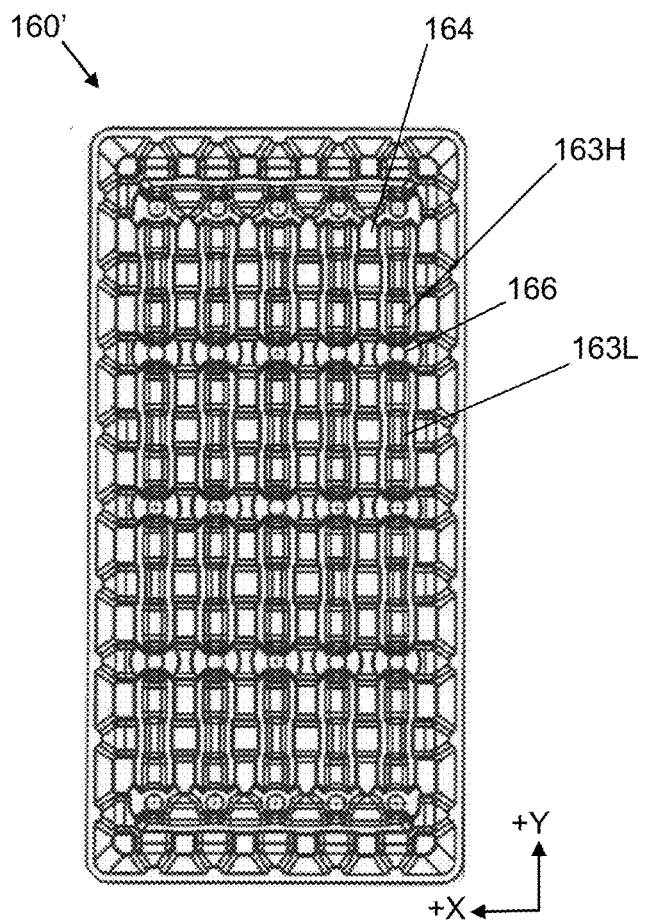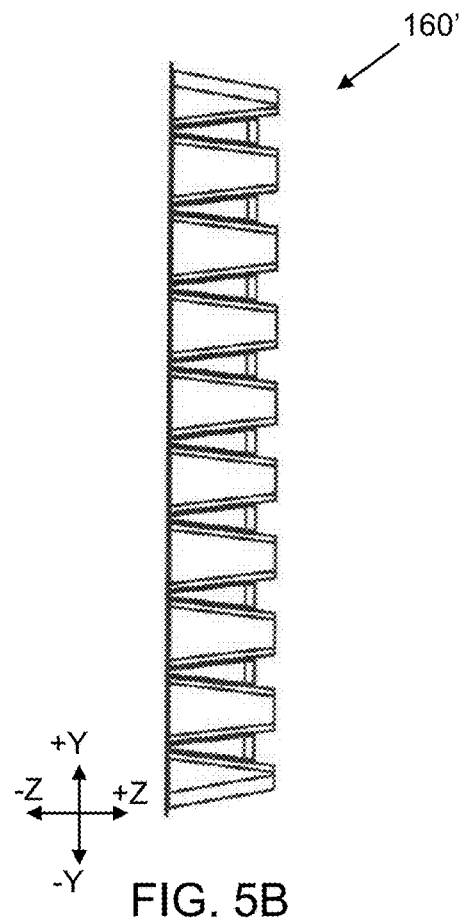
FIG. 5A
FIG. 5B
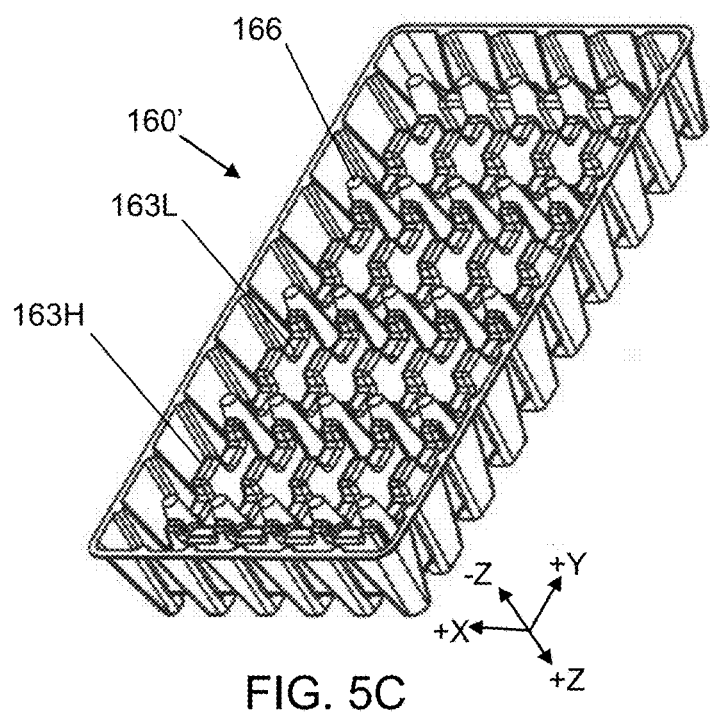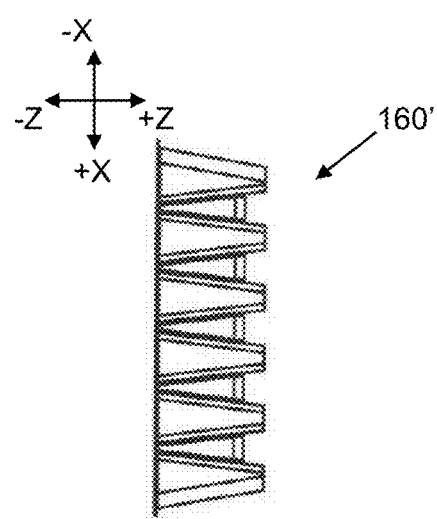
FIG. 5C
FIG. 5D

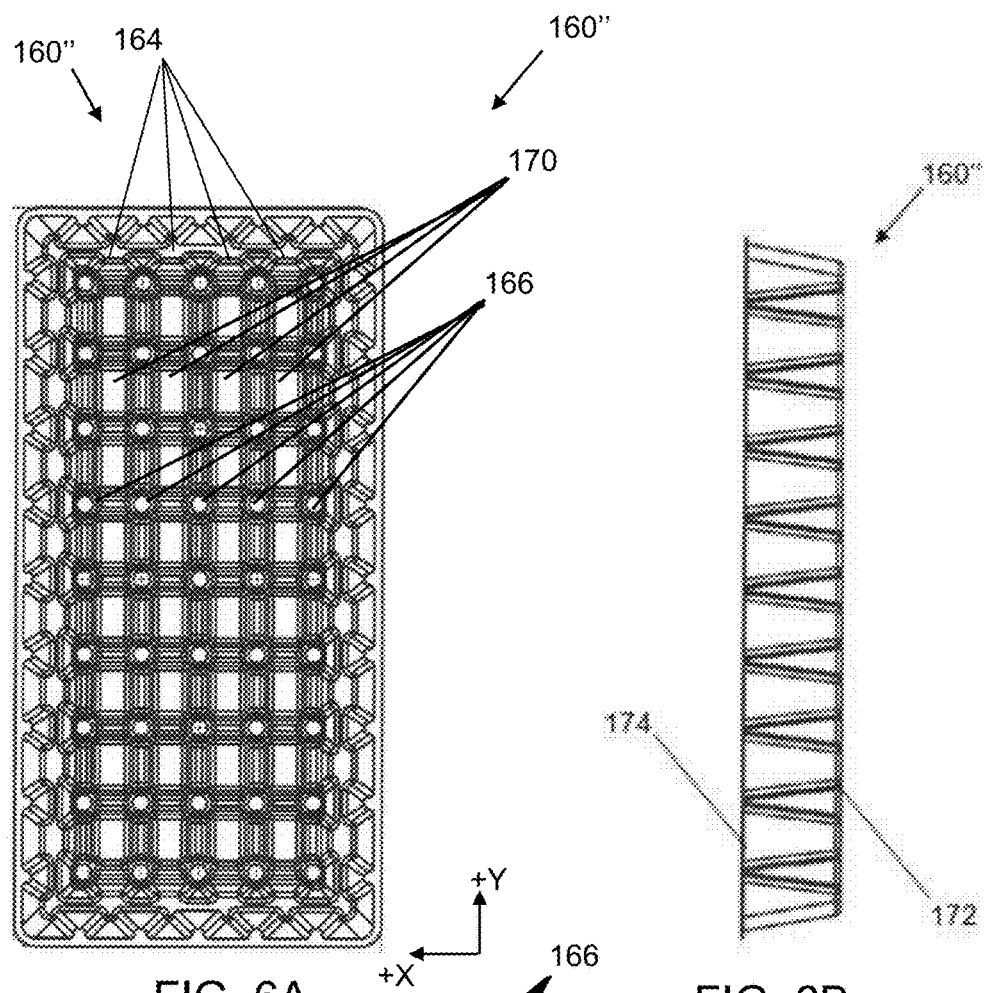
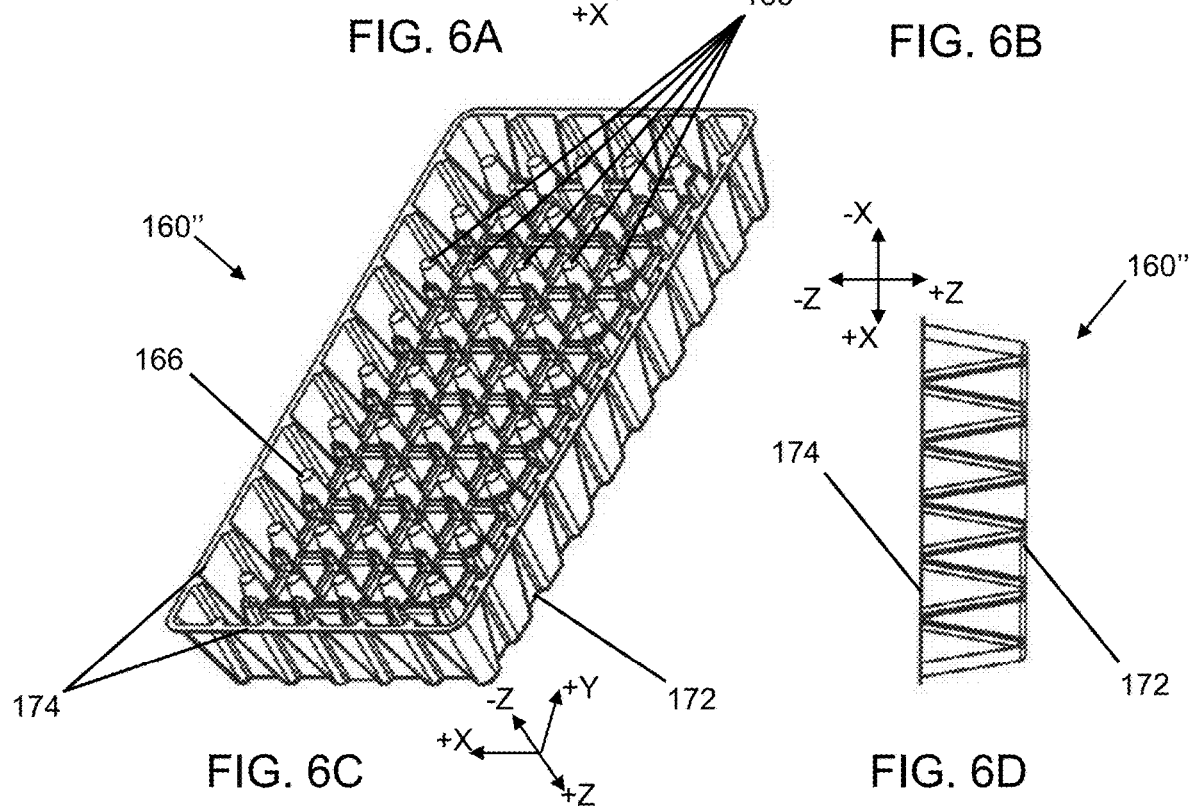
FIG. 6A  FIG. 6B
FIG. 6C  FIG. 6D

DISPOSABLE OIL CHANGE KIT

RELATED APPLICATIONS

This application is a continuation-in-part of and claims priority benefit of U.S. patent application Ser. No. 16/672,388, filed Nov. 1, 2019, which is a continuation-in-part of U.S. patent application Ser. No. 13/538,412, filed 29 Jun. 2012, which claims priority benefit of Provisional Application Ser. No. 61/658,655, filed 12 Jun. 2012; the contents of which are hereby incorporated by reference.

FIELD OF THE INVENTION

The present invention in general relates to the collection, storage and disposal of used and spent liquids, and in particular to a disposable oil change kit for servicing engines.

BACKGROUND OF THE INVENTION

The high cost of owning and maintaining an automobile has led many vehicle owners to drain and change their own oil at home. Typically, the oil change performed by the vehicle owner is done in a haphazard manner, with the vehicle owner utilizing any available household receptacle, such as a bowl or cooking pan, to receive the dirty or spent engine oil. Subsequently, the dirty oil must be disposed of in an ecologically responsible manner into some larger licensed receptacle, thus increasing cost and adding further inconvenience to the procedure. Furthermore, there is greater likelihood of spilling the dirty oil during the oil changing operation using readily available household equipment.

The spilt oil results in driveways and garages being stained. Further, the leakage or spilling of oil results in a significant amount of oil accumulating on the roadways. During rains, the accumulated oil can present a driving hazard to motorists as the oil makes the roadway slick. Additionally, during rains the oil on the driveways and roadways eventually ends up in streams, waterways, and ground water thereby creating a significant environmental problem.

Thus, there exists a need for an economical oil change kit that collects and provides for the disposal of spent or dirty oil in an ecologically safe manner.

SUMMARY OF THE INVENTION

A liquid disposal tool in the form of a disposable oil change kit (DOCK) is provided for changing engine oil or other hydrocarbon containing products whereby the spent oil or hydrocarbon is encapsulated in a non-biodegradable substance rendering the kit safe for disposal in a non-hazard or controlled substance landfill. Embodiments of a container insert tray for dispersing spent hydrocarbons may be formed from scrap news print that has been emulsified into liquefied slurry that is injected into a mold, thus creating a uniquely designed dispersion tray.

In specific embodiments, the disposable container insert tray is composed of rows of conical shaped protrusions that are used to channel the hydrocarbon materials to all levels of the container so that the hydrocarbon can be exposed to the maximum volume of the non-biodegradable substance for total encapsulation. In other specific embodiments in order to maximize the rate of absorption and efficiency of the encapsulating material, various slits or holes are strategically placed within each conical shaped protrusion of the insert tray.

In other specific embodiments, the top of the oil change kit container is covered with a diffuser sheet formed of an open weave fabric material that acts as a liquid diffuser whereby the hydrocarbon materials are spread more equally throughout the confines of the container and on to the surface of the tray insert. The polypropylene material has a center taper of about 1 inch depth to create a reservoir in the top of the container that accommodates the on-rush of dirty oil upon opening the drain plug to an oil pan, and prevents an over-flow condition.

An absorbent including but not limited to a non-degradable substance, such as peat moss that has been specially processed and is capable of absorbing hydrocarbons with total encapsulation is present underneath the tray insert. The peat moss prevents the hydrocarbons from escaping or exhibiting any form of free flow once the encapsulation has occurred. The encapsulation process provided by the absorbent non-degradable substance is what allows the DOCK to be disposed of in a non-hazardous or controlled substance landfill.

BRIEF DESCRIPTION OF THE DRAWINGS

FIGS. 4A-4E are a series of perspective views of an embodiment of a contoured insert tray for use in embodiments of the inventive liquid disposal tool;

FIGS. 5A-5F are a series of perspective views of another embodiment of a contoured insert tray with a set of rows that separate a series of conical depressions for use in embodiments of the inventive liquid disposal tool;

FIGS. 6A-6G are a series of perspective views of yet another embodiment of a contoured insert tray with a higher density of conical depressions for use in embodiments of the inventive liquid disposal tool;

DESCRIPTION OF THE INVENTION

Figure 1:
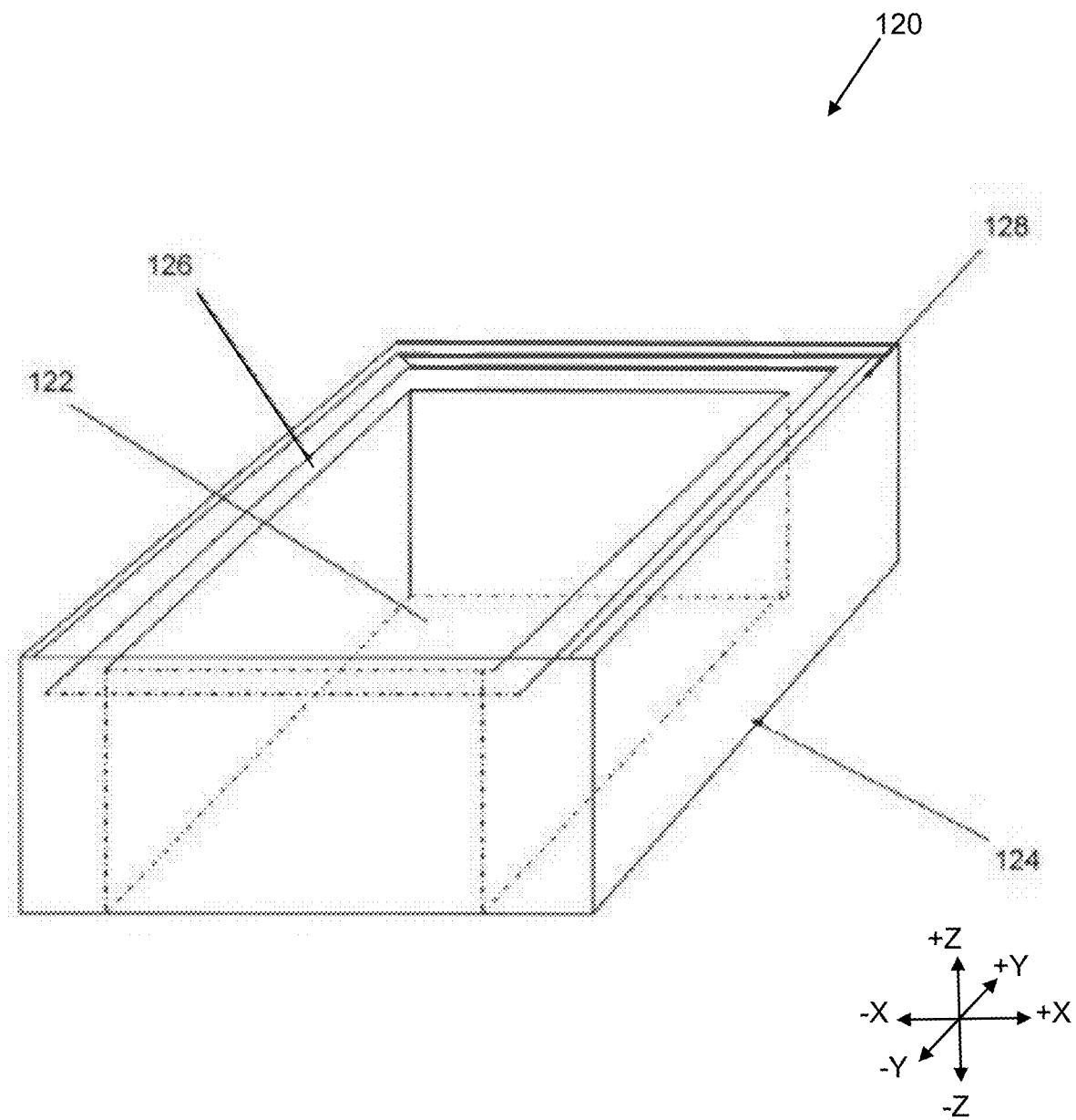
FIG. 1 is a see through diagram of a container portion of a liquid disposal tool according to embodiments of the invention.

The present invention has utility as a liquid disposal tool. An inventive liquid disposal tool may be used to collect liquids that drip from equipment over time, or in a particular non-limiting application as a disposable oil change kit (DOCK) for emptying an engine of dirty oil during an oil change. Embodiments of the liquid disposal tool absorb a variety of liquids illustratively including spent oil, other hydrocarbon fuel, or combinations thereof in a substance and in specific instances rendering the tool safe for disposal in a non-hazard or controlled substance landfill.

In embodiments of the inventive liquid disposal tool, a disposable container insert tray is composed of protrusions that are used to channel the liquid downward within the container so that the liquid can be directly injected below the top surface of the absorbent substance so as to expose the liquid to the maximum volume of the absorbent substance. The protrusions have a variety of shapes illustratively including conical, stepped, cuboidal, frustoconical, and other polygonal forms. In specific embodiments slits and holes may be present in some or all of the protrusions to directly expose the liquid to the absorbent substance. The structure of the insert tray is designed to provide a reservoir to hold the oil long enough to allow the absorbent to absorb the liquid. A physical limitation of the absorption when the liquid is 10/30 weight motor oil is that the oil can only be absorbed from a diameter of about 2 inches. In other embodiments, in order to maximize the rate of absorption and efficiency of the absorbent, various slits or holes are strategically placed within each protrusion of the insert tray.

The top of the inventive liquid disposal tool in some specific embodiments may be covered with a diffuser sheet formed of an open weave fabric that acts as a liquid diffuser whereby the liquid or hydrocarbon materials are spread more equally throughout the confines of the container and on to the surface of the tray insert. This diffuser sheet is synonymously referred to herein as a top or top cover. The diffuser sheet is illustratively formed from materials synthetics such as polypropylene, polyethylene, polyamides, and polystyrenes; and natural fibers such as cotton, hemp, jute, and other cellulosics. The mesh coating of the diffuser sheet fabric provides a capillary action to spread the oil across the whole surface. The fabric in some specific embodiments has a center depression to create a reservoir in the top of the container that accommodates the on-rush of liquids. In another specific embodiment the taper at the center of the fabric is about one inch and in other embodiments ranges between 0.5 and 2 inches. For example, in the application of the liquid disposal tool for an oil change or DOCK, the on-rush of dirty oil exiting upon opening the drain plug to an oil pan is controlled on the surface of the fabric and prevents an over-flow condition.

An absorbent operative herein illustratively includes peat moss; peat moss that has been specially processed and is capable of absorbing hydrocarbons with total encapsulation; cellulosics such as corn cob grit, saw dust, paper, straw, and cotton; clays such as cat litter; synthetic polymers such as polyethylene, polypropylene and polyacrylics. This or other absorbents specific to the liquid to be absorbed is present underneath a tray insert, filling the tray insert, or both. Peat moss prevents the hydrocarbons from escaping or exhibiting any form of free flow once the encapsulation has occurred. Peat moss is a well suited material for absorbing oil because the oil penetrates into the peat core and does not seep from it. In contrast, other conventional absorbents operative herein are either only surface coated (cellulosics such as sawdust or corn cob grit) or becomes softened with the absorption (polyethylene). In specific embodiments the absorbent may also further include oil eating microbes. It is appreciated that some disposal regulations allow for oil that has been encapsulated in an inventive liquid disposal tool or DOCK to be disposed of in a non-hazardous or controlled substance landfill.

Figures 2A, 2B:
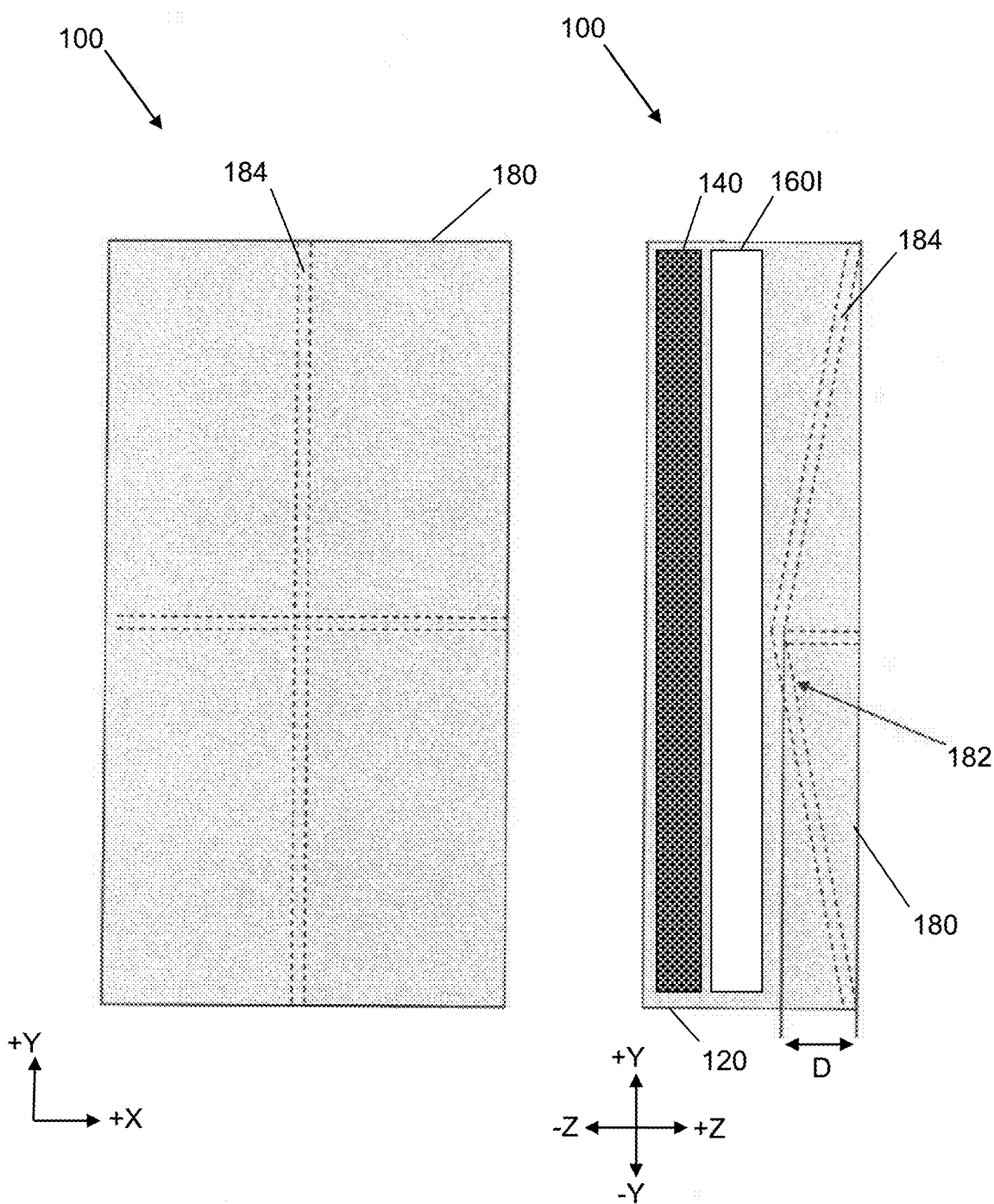
FIGS. 2A and 2B are top and side views of the inventive liquid disposal tool with the container of FIG. 1 with an open weave polypropylene material that acts as a diffuser sheet and cover above a generic representation of a contoured insert tray that rests on an absorbent both of which are housed within the container.
Figure 3A:
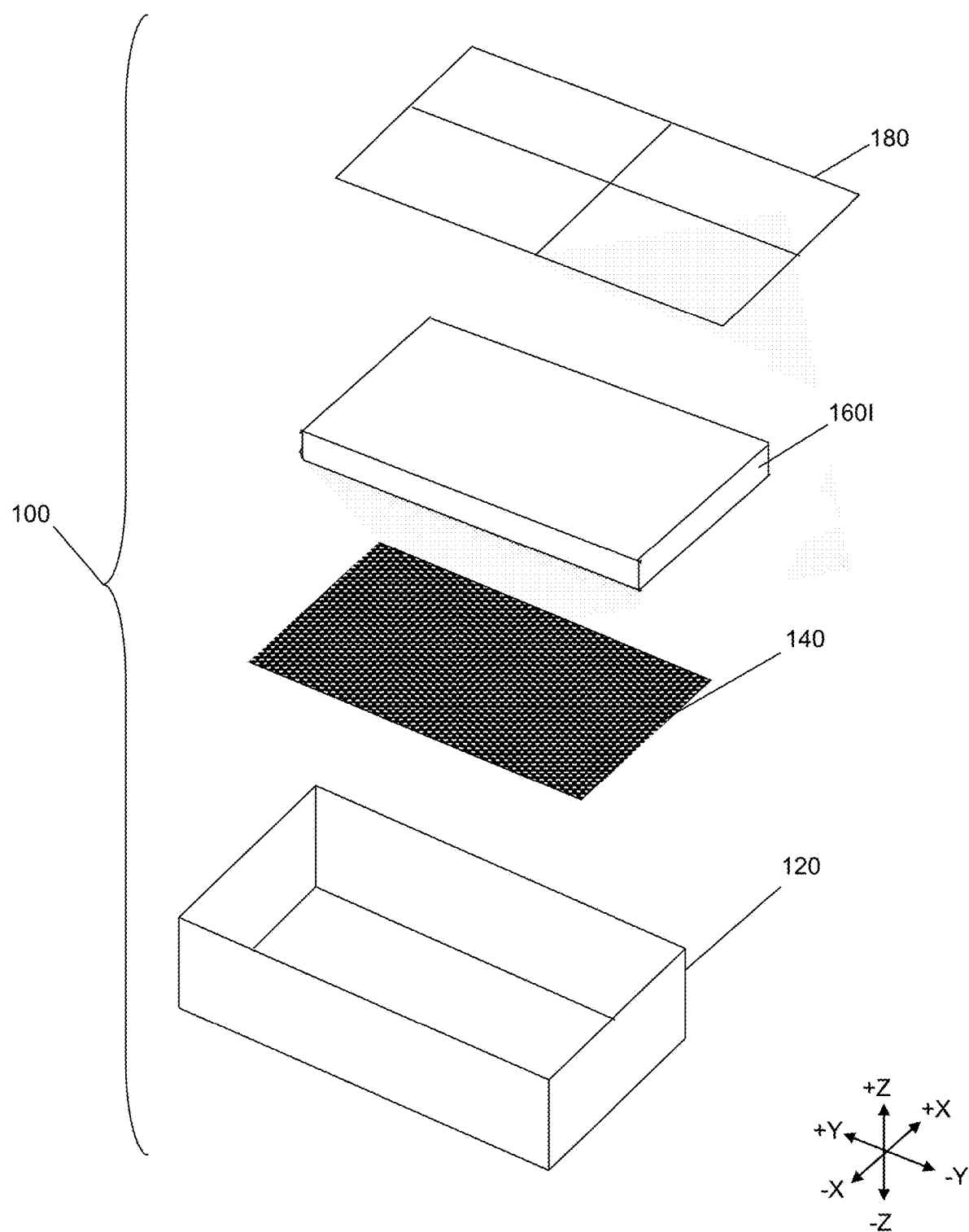
FIG. 3A is an exploded perspective view of the liquid disposal tool with the generic representation of a contoured insert tray according to embodiments of the invention.
Figure 3B:
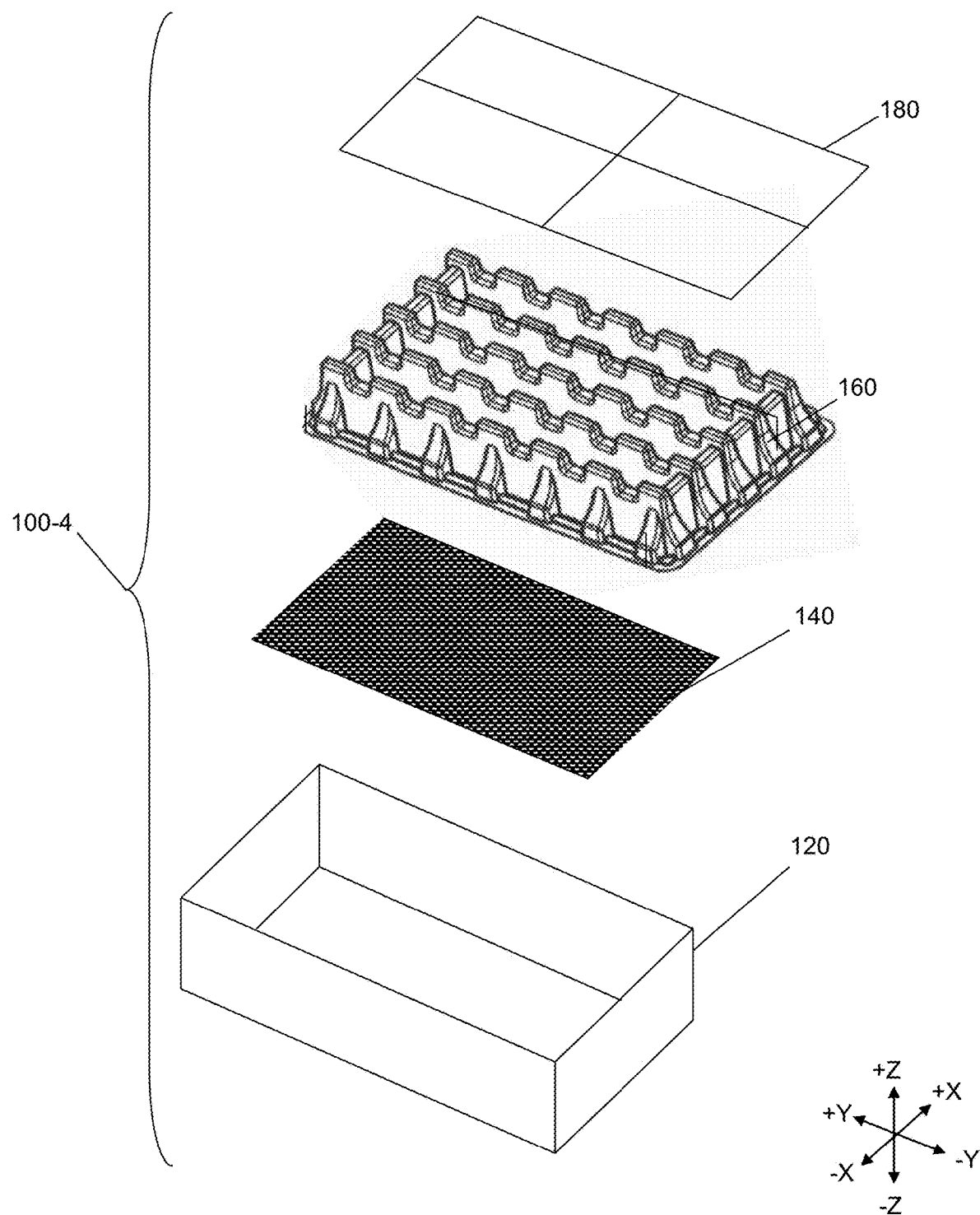
FIG. 3B is an exploded perspective view of the inventive liquid disposal tool, where the generic representation of a contoured insert tray is replaced with an embodiment of the insert tray shown in greater detail in FIGS. 4A-4E.
Figure 4E:
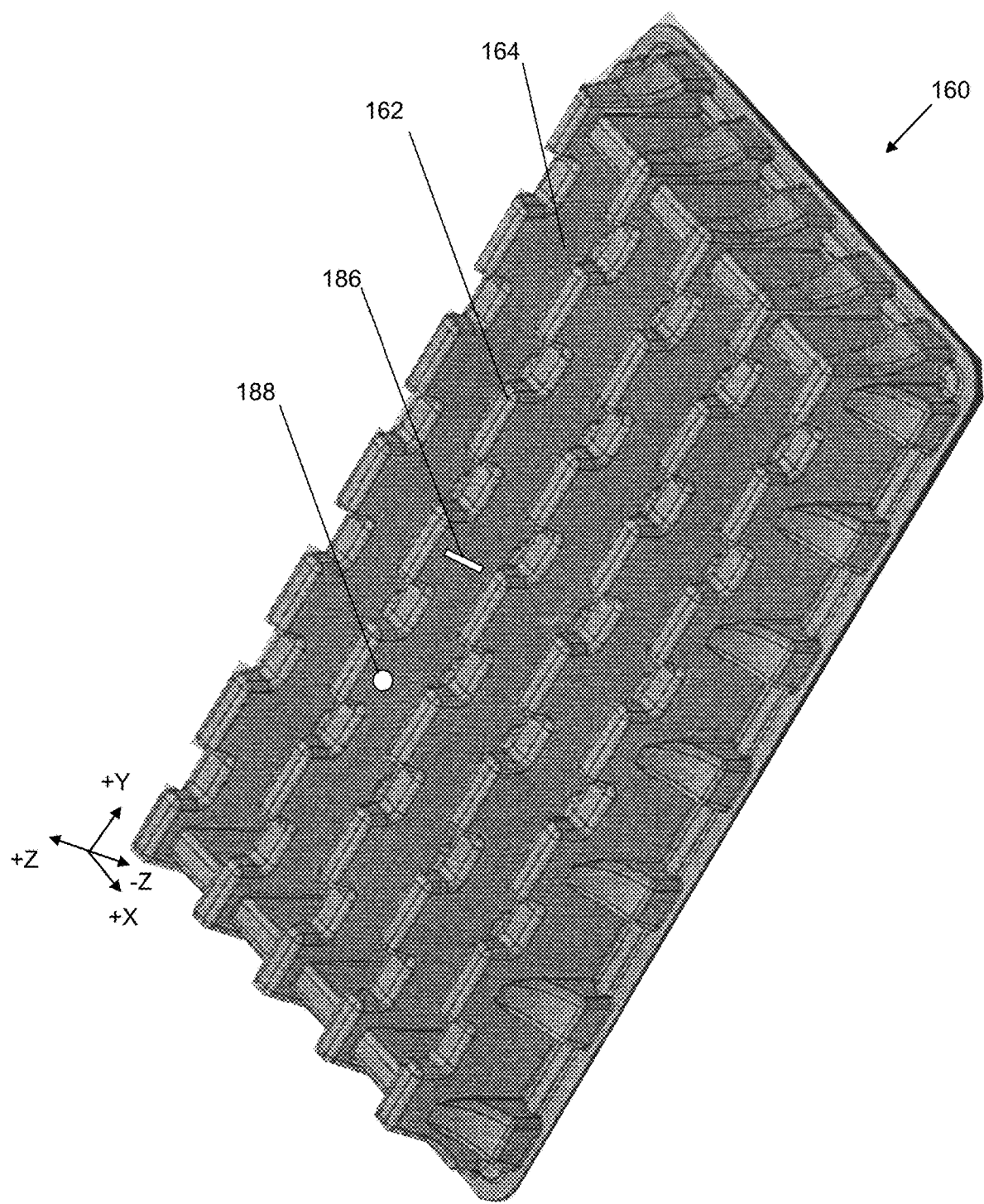

Referring now to the figures, FIG. 1 is a partial transparent view diagram of a container portion 120 of a liquid disposal tool 100 as shown in FIGS. 2A, 2B, 3A, and 3B according to specific embodiments of the invention. The container 120 is illustratively formed from a variety of materials such as paper, cardboard, plastic, oriented strand board (OSB), sugar cane, and any composite material containing any of the aforementioned. It is appreciated that the container 120 is readily formed of virgin or recycled materials. The container portion 120 has a bottom 122 where an absorbent 140 is placed, as shown in FIGS. 2B, 3A, and 3B. Optionally, the absorbent 140 may be treated with microbes that digest the absorbed liquid, such as microbes that digest petroleum based products such as oil absorbent microbes. These are detailed for example in U.S. Pat. No. 5,348,803. The container 120 also has walls 124 with a perimeter shelf 126 and upper lip 128. The perimeter shelf 126 serves as an attachment point for a diffuser sheet 180. In an embodiment the diffuser sheet 180 may be glued to the perimeter shelf 126 with for example ultra violet (UV) glue. Extending from the perimeter shelf 126, the upper lip 128 serves to catch and contain a sudden flow of liquids. The container 120, though depicted as a rectangle in the figures, it is appreciated that it may assume a variety of shapes including a square, triangle, circle, cube, or trapezoid.

The diffuser sheet 180, which is shown in greater detail in FIGS. 2A and 2B, covers the container 120, the absorbent 140, and the tray insert 160I. The tray insert 160I is a generic representation of specific embodiments of actual tray inserts 160, 160', 160", and 160''' as shown in complete detail in FIGS. 4A, 4B, 4C, 4D, 4E, 5A, 5B, 5C, 5D, 5E, 5F, 6A, 6B, 6C, 6D, 6E, 6F, 6G, and 7. The diffuser sheet 180 overlays the insert 160I. The diffuser sheet/cover 180 acts as a liquid diffuser whereby the liquid is spread more equally throughout the confines of the container and on to the surface of the tray insert 160I. The diffuser sheet 180 has a center taper 182 to create a reservoir in the top of the container that accommodates the on-rush of liquids. The taper 182 is optionally created by attaching the fabric of the diffuser sheet 180 to stringers 184. This attachment is readily accomplished by conventional techniques such using ultra-violet light (UV) activated adhesives, hot melt glues, contact adhesives and the like. In another specific embodiment, the taper at the center of the diffuser sheet material may have a depth (D) of about one inch or between 0.5 and 2 inches. In another specific embodiment (not shown) that does not use the tray insert 160I, the diffuser sheet 180 also serves to retain the absorbent 140.

FIG. 3A is an exploded perspective view of the liquid disposal tool 100, as best shown in FIG. 2B, that shows the placement of the major component parts. As described above, the container 120 houses the absorbent 140, the tray insert 160I that is a generic representation of specific embodiments of actual tray inserts 160, 160', 160", and 160''' as shown in complete detail in FIGS. 4A, 4B, 4C, 4D, 4E, 5A, 5B, 5C, 5D, 5E, 5F, 6A, 6B, 6C, 6D, 6E, 6F, 6G, and 7, and the top cover/diffuser sheet 180.

FIG. 3B is an exploded perspective view of the inventive liquid disposal tool 100-4, where the generic representation of a contoured insert tray 160I is replaced with an embodiment of the insert tray 160 that is shown in greater detail in FIGS. 4A-4E.

FIGS. 4A-4E are a series of perspective views of a specific embodiment of a contoured insert tray 160. The insert tray 160 has a series of elevations 162 separated by rows 164 that are used to channel the liquid downward to the lower levels of the container so that the liquid can be exposed to the maximum volume of the absorbent or the non-biodegradable substance for total encapsulation. In other specific embodiments in order to maximize the rate of absorption and efficiency of the encapsulating material, various slits 186 or holes 188 are strategically placed within some or all elevations 162 of the insert tray 160. The insert tray 160 is formed of the same materials as container 120. Preferably, recycled materials are used for forming the insert tray 160. Embodiments of a container insert tray 160 for dispersing spent hydrocarbons are readily formed from scrap news print or sugar cane pulp that has been emulsified into liquefied slurry that is injected into a mold that provides the shape of the insert, thus creating a uniquely designed dispersion tray.

Figure 5E:
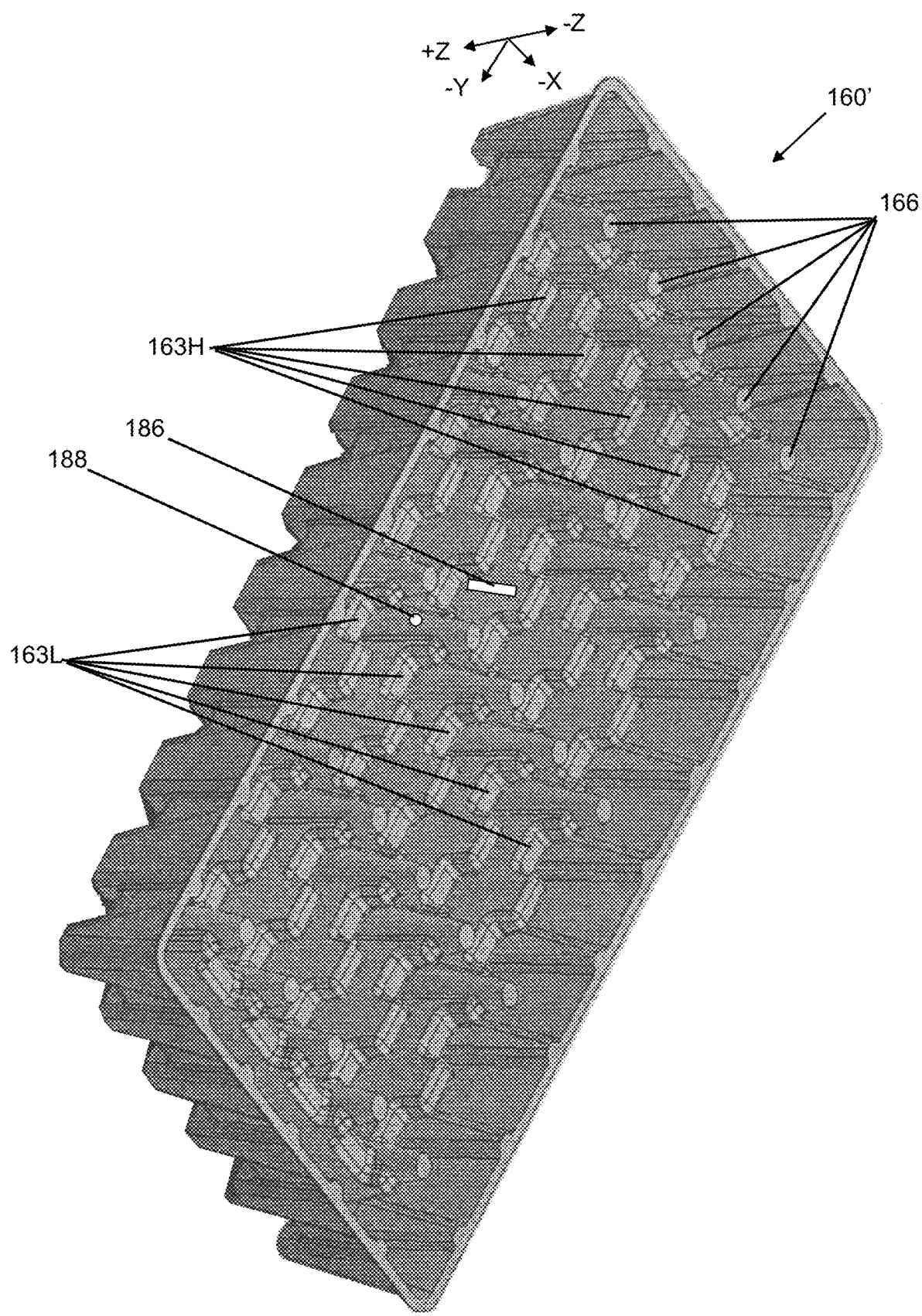
Figure 5F:
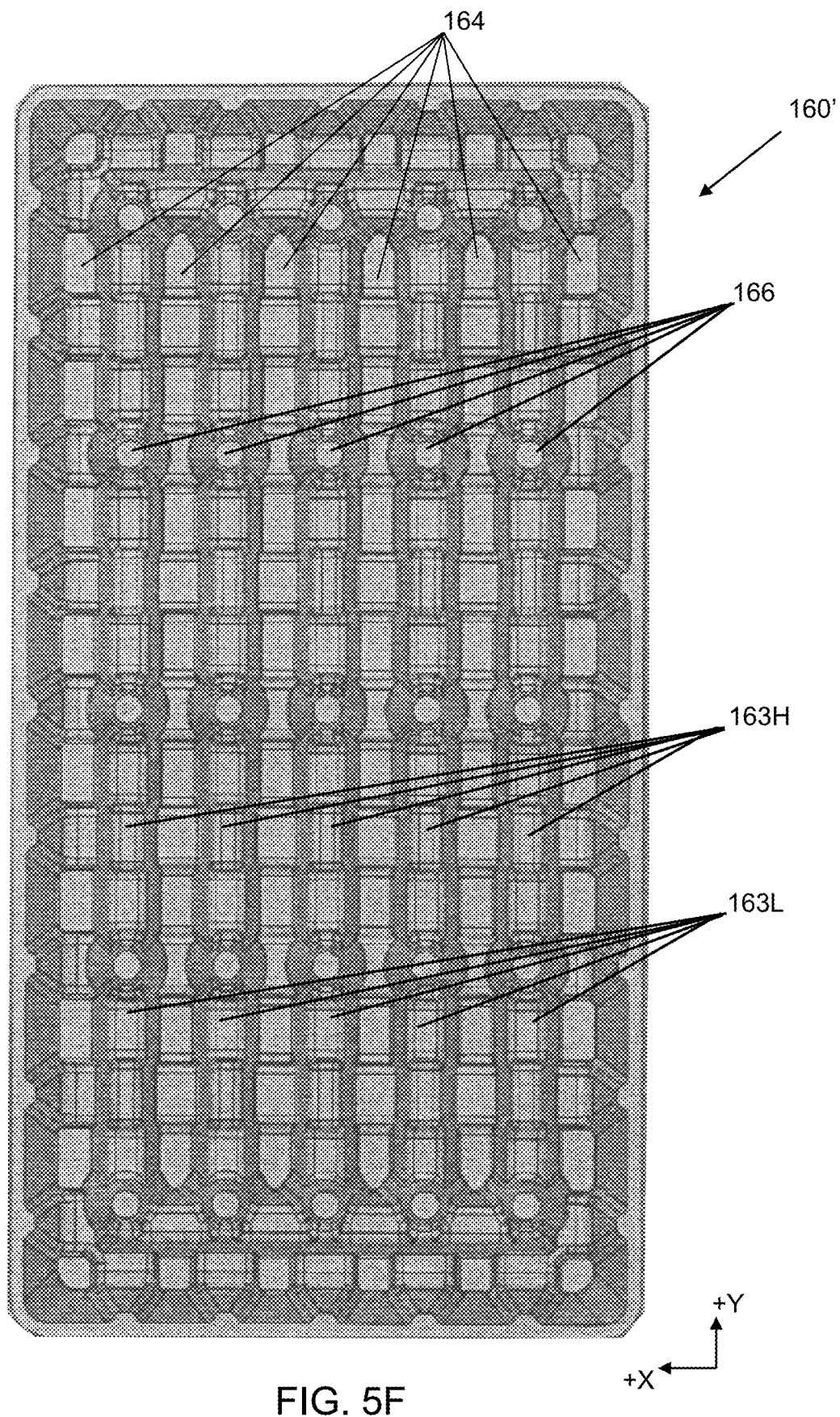
Figure 6E:
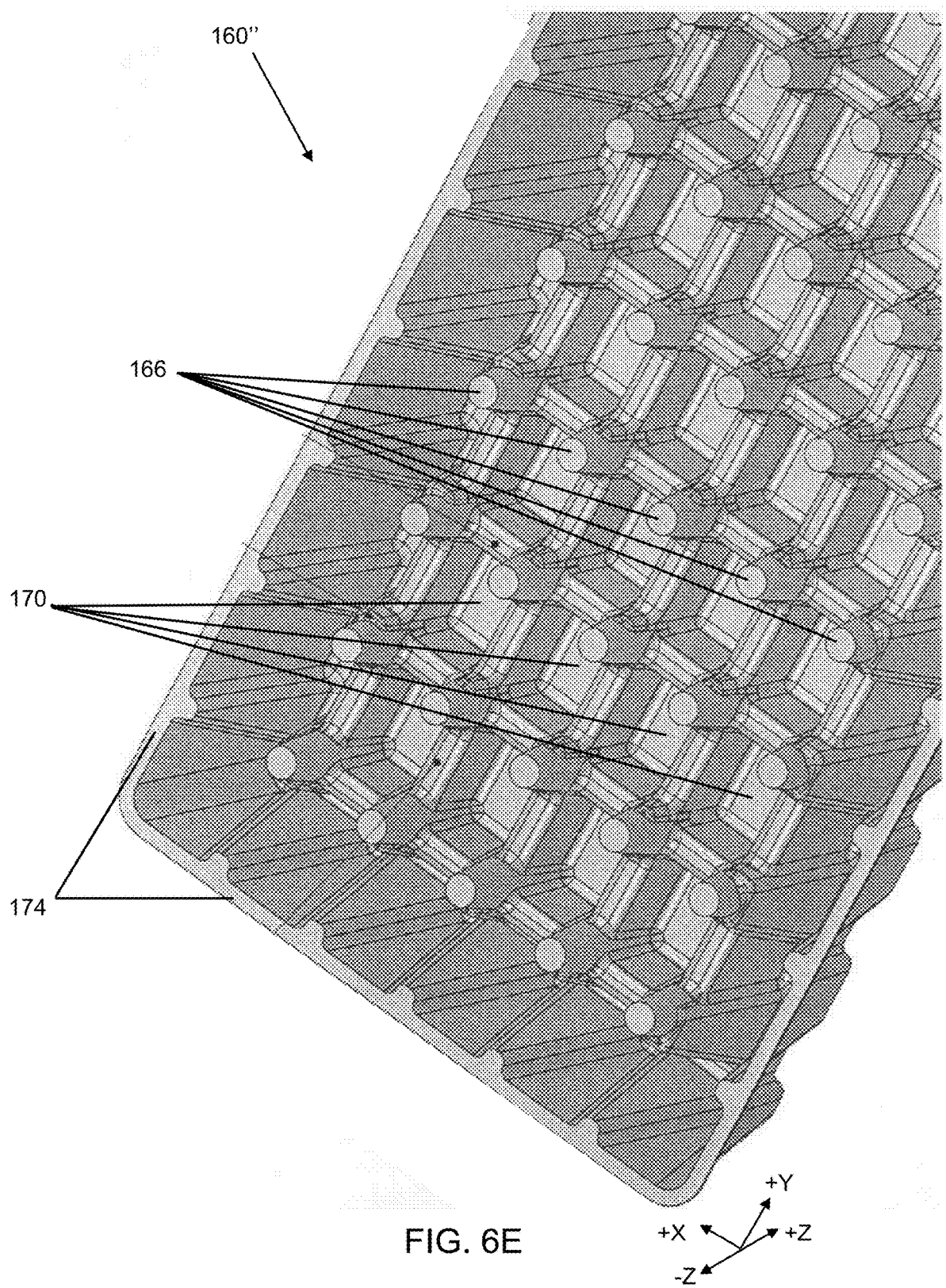
Figure 6F:
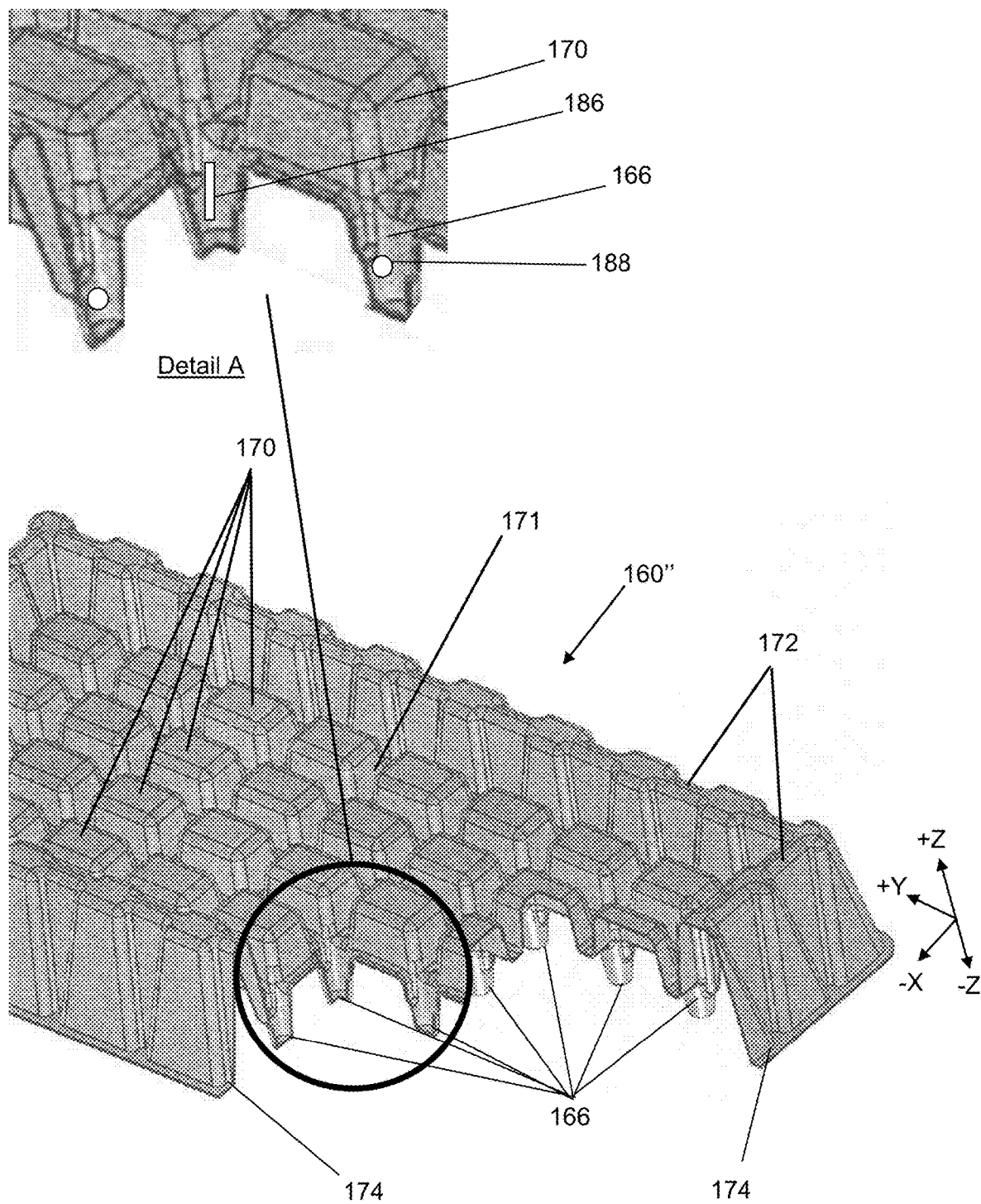
Figure 6G:
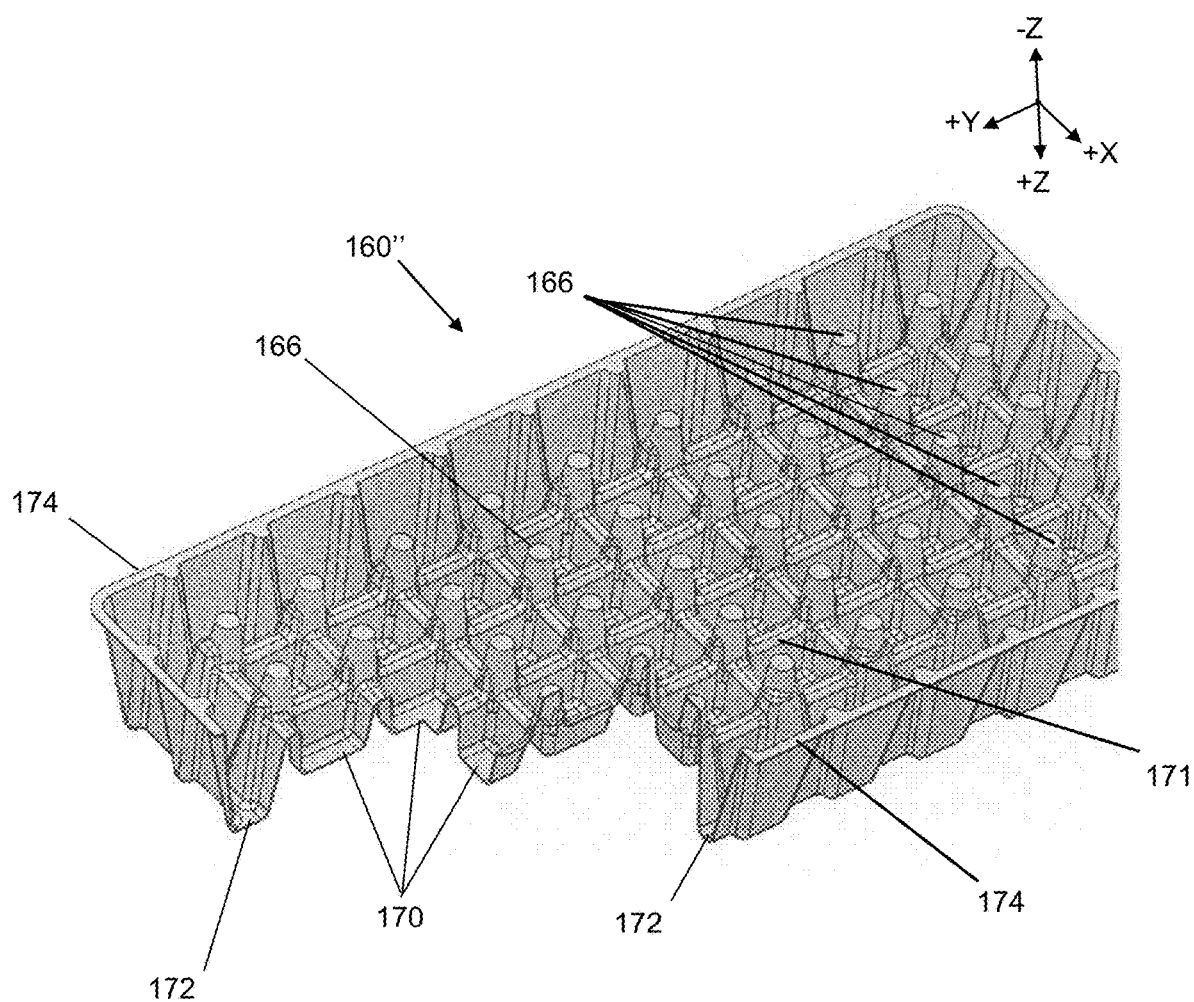

FIGS. 5A-5F are a series of perspective views of another specific embodiment of a contoured insert tray 160' with rows 164 separating conical depressions 166. The insert tray 160' may have an ordered array of features, synonymously referred to herein as high tiered protrusions 163H and lower tiered protrusions 163L, as best shown in the embodiments of FIGS. 5C, 5E, 5F, that are also separated by rows 164, and conical depressions 166 protruding into an underlying absorbent 140 that are used to channel the liquid downward within the container so that the liquid is exposed to the maximum volume of the absorbent 140 for absorption or encapsulation. It is appreciated that additional absorbent 140 is readily placed within the tray 140 as well (not shown for visual clarity). In other specific embodiments, in order to maximize the rate of absorption and efficiency of the absorbent located beneath the tray 160, various slits 186 or holes 188 may be strategically placed within each high tiered protrusion 163H and conical depression 166 of the insert tray 160'. The insert tray 160' is formed of the same materials as container 120. Preferably, recycled materials will be used for forming the insert tray 160'. Embodiments of a container insert tray 160' for dispersing spent hydrocarbons are readily formed from scrap news print or sugar cane pulp that has been emulsified into liquefied slurry that is injected into a mold that provides the shape of the insert, thus creating a uniquely designed dispersion tray.

Figure 8A:
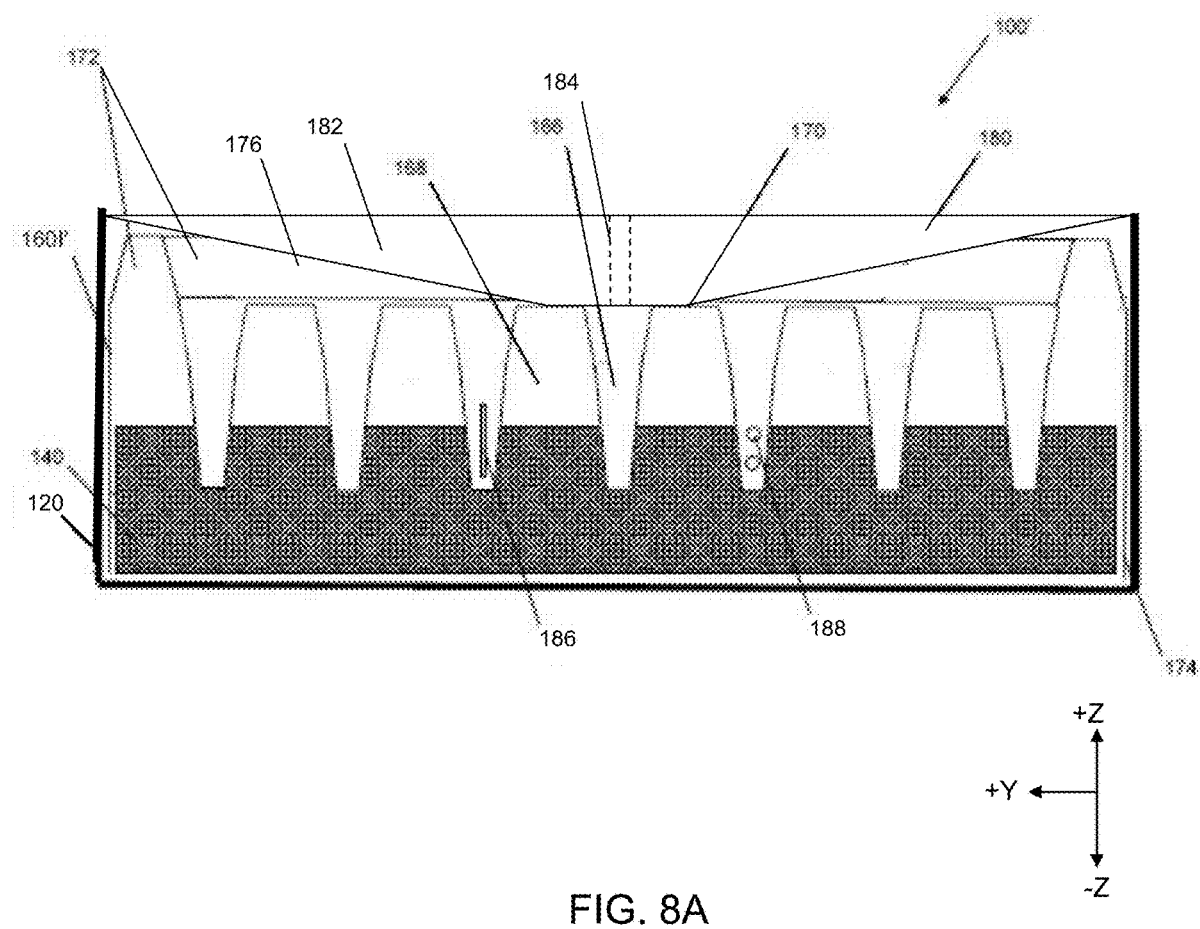
FIG. 8A is a side cross-sectional view of the inventive liquid disposal tool of FIGS. 1, 2A, 2B, and 3A that show conical depressions protruding into the absorbent layer.
Figure 8B:
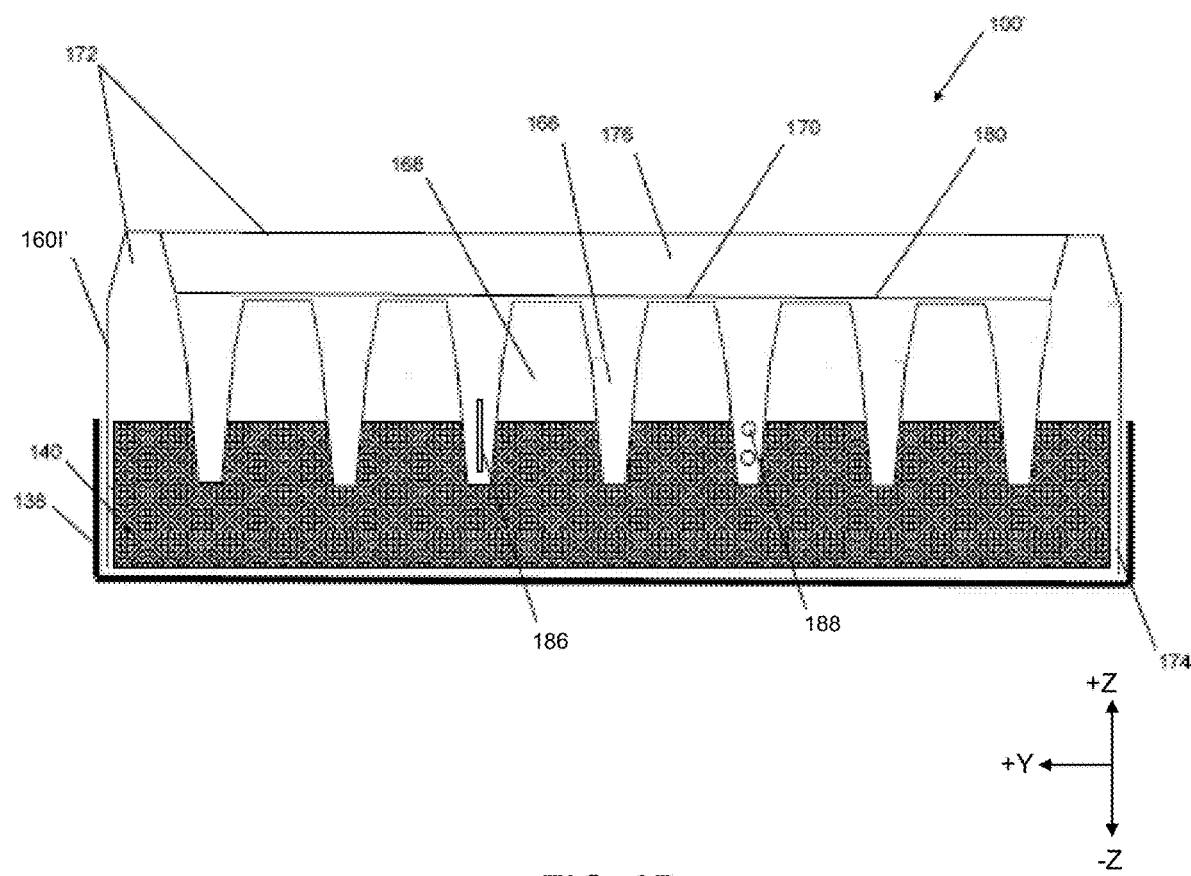
FIG. 8B is a side cross-sectional view of an additional embodiment of an inventive liquid disposal tool according to embodiments of the present invention configured with an under try for holding the absorbent encapsulating material.

FIGS. 6A-6G are a series of perspective views of an embodiment of a contoured insert tray 160" with a series of rows 164 that separate conical depressions 166. The insert tray 160" may have the conical depressions 166 protruding into absorbent layer 140 (as shown in FIG. 8A and 8B) that are used to channel the liquid or hydrocarbon materials to all levels of the container so that the liquid is exposed to a large percentage of the volume of the absorbent 140 or the non-biodegradable substance for total encapsulation. In embodiments in order to maximize the rate of absorption and efficiency of the encapsulating material, various slits 186 or holes 188, (as shown in Detail A in FIG. 6F) may be strategically placed within each of the conical depressions 166 of the insert tray 160". A series of flat top pedestals 170 in the rows 164 extend upward from the insert tray 160", with respect to the bottom of the container 120 when the tray 160" is placed in the container 120. The flat top pedestals 170 are separated by a series of gaps 171, where the flat top pedestals 170 are wider than the gaps 171. The gaps 171 also serve as channels to distribute the liquid or hydrocarbon materials. The flat top pedestals 170 serve as supports and as an attachment point for diffuser sheet 180, which is shown in greater detail in FIGS. 2A and 2B and in FIGS. 8A and 8B. The diffuser sheet 180 acts as a diffuser whereby the liquid is spread more equally throughout the confines of the container and on to the surface of the tray insert 160". The upper rim 172 extends above the flat top pedestals 170 and defines a collection volume 176 between the diffuser sheet 180 and the flat top pedestals 170. In a similar manner, the lower rim 174 extends below the conical depressions 166 to provide an area to place the absorbent 140 (as shown in FIGS. 8A and 8B). The insert tray 160" is formed of the same materials as container 120. Preferably, recycled materials may be used for forming the insert tray 160". Embodiments of a container insert tray 160" for dispersing spent hydrocarbons may be formed from scrap news print or sugar cane pulp that has been emulsified into liquefied slurry that is injected into a mold, thus creating a uniquely designed dispersion tray.

Figure 7:
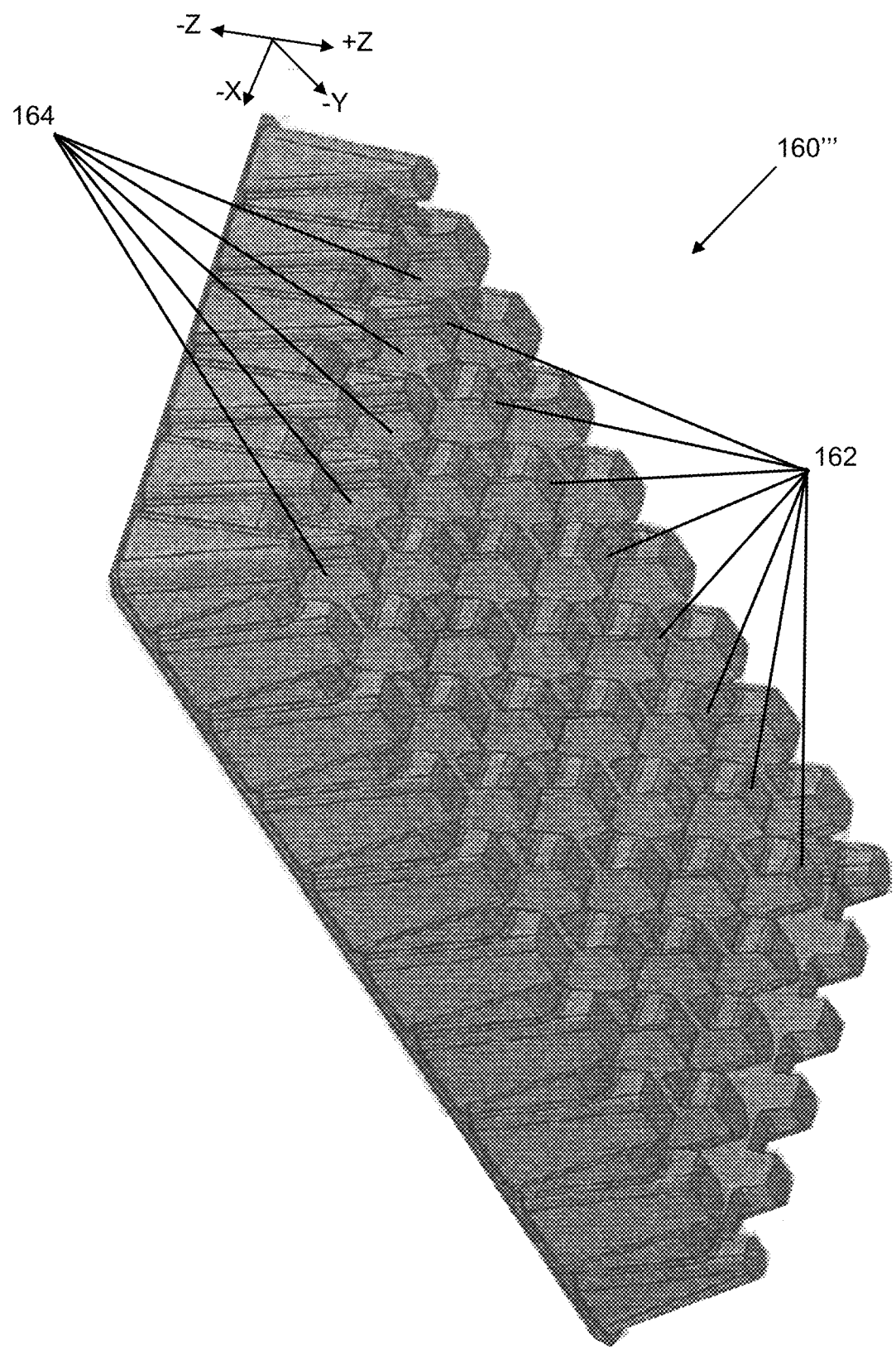
FIG. 7 is a perspective view of an additional embodiment of a contoured insert tray for for use in embodiments of the inventive liquid disposal tool.

FIG. 7 is an additional perspective view of a contoured insert tray 160''' with rows 164 separating an array of flat top elevations 175.

FIG. 8A is a side cross-sectional view of the inventive DOCK of FIGS. 1, 2A, 2B, and 3A that show conical depressions 166 protruding into the absorbent layer 140. As shown, slots 186 or holes 188 are strategically placed within the conical depressions 166 of the insert tray 160I' in order to maximize the rate of absorption and efficiency of the encapsulating material. The insert tray 160I' is a generic representation of specific embodiments of actual tray inserts 160' and 160", as shown in complete detail in FIGS. 5A, 5B, 5C, 5D, 5E, 5F, 6A, 6B, 6C, 6D, 6E, 6F, and 6G, It is appreciated that the insert tray 160 and 160''' as shown in FIGS. 4A, 4B, 4C, 4D, 4E, and 7 may also be inserted in the container 120 as described above. Void areas 168 hold the liquid as the liquid is being absorbed into the absorbent encapsulating material 140. Also shown in FIG. 8A, the diffuser sheet 180 has a center taper 182 to create a reservoir in the top of the container that accommodates the on-rush of liquids. The taper 182 is optionally created by attaching the fabric of the diffuser sheet 180 to stringers 184. The diffuser sheet 180 may rest or be attached to the flat top pedestals 170. Void areas 168 hold the liquid as the liquid is being absorbed into the absorbent encapsulating material 140. The upper rim 172 extends above the flat top pedestals 170 and defines a collection volume 176 between the diffuser sheet 180 and the flat top pedestals 170.

FIG. 8B is a side view of an alternative embodiment of the liquid disposal tool 100' configured with an under tray 138 for holding the absorbent encapsulating material 140. The under tray 138 may be joined directly to the insert tray 160I' via glue, frictional fitting, a shrink wrap or the like. The under tray 138 may be made of the same materials as the insert tray 160I'. In embodiments the under tray may be made of materials including paper, cardboard, plastic, oriented strand board (OSB), sugar cane, and composite material containing any of the aforementioned. In embodiments the under tray may be made of a recycled material. The insert tray 160I' is a generic representation of specific embodiments of actual tray inserts 160' and 160", as shown in complete detail in FIGS. 5A, 5B, 5C, 5D, 5E, 5F, 6A, 6B, 6C, 6D, 6E, 6F, and 6G, It is appreciated that the insert tray 160 and 160''' as shown in FIGS. 4A, 4B, 4C, 4D, 4E, and 7 may also be inserted in the under tray 138. Diffuser sheet 180 covers the insert tray 160I'. Void areas 168 hold the liquid as the liquid is being absorbed into the absorbent encapsulating material 140. In specific inventive embodiments, the absorbent 140 may further include at least one of sawdust, corncob, cat litter or a polyalkylenes.

The foregoing description is illustrative of particular embodiments of the invention, but is not meant to be a limitation upon the practice thereof. The following claims, including all equivalents thereof, are intended to define the scope of the invention.

The invention claimed is:

1. A liquid disposal tool for the collection and disposal of liquids comprising:
    a container with a bottom portion and a set of walls;
    a peat moss absorbent resting on said bottom portion within said walls, said absorbent configured to collect said liquid;
    an insert tray overlaying said absorbent, said insert tray contoured with a series of rows separating a set of conical depressions protruding downward into said absorbent layer, and a series of flat top pedestals in the series of rows, said series of flat top pedestals extending upward with respect to said bottom portion of said container, and a series of gaps that separate the flat top pedestals;
    a diffuser sheet overlaying said insert tray; and
    wherein said flat top pedestals are wider than said gaps, where said gaps serve as channels to distribute the liquid or hydrocarbon materials, and said flat top pedestals serve as supports and as attachment points for said diffuser sheet.

2. The liquid disposal tool of claim 1 wherein said container is made of materials comprising paper, cardboard, plastic, oriented strand board (OSB), sugar cane, and composite material containing any of the aforementioned.

3. The liquid disposal tool of claim 1 wherein said container is made of a recycled material.

4. The liquid disposal tool of claim 1 wherein said top portion of said walls further comprise a perimeter shelf with an upper lip.

5. The liquid disposal tool of claim 1 wherein said absorbent further comprises at least one of sawdust, corn cob, or cat litter.

6. The liquid disposal tool of claim 1 wherein said insert tray is formed from scrap news print or sugar cane pulp that has been emulsified into liquefied slurry that is injected into a mold.

7. The liquid disposal tool of claim 1 wherein said insert tray is made of at least one of a paper, cardboard, plastic, oriented strand board (OSB), sugar cane, and any composite material containing any of the aforementioned.

8. The liquid disposal tool of claim 1 wherein said diffuser sheet is made of an open weave fabric of polypropylene, polyethylene, polyamides, polystyrenes, and cellulosics.

9. The liquid disposal tool of claim 1 wherein said diffuser sheet has a center taper that creates a reservoir to accommodate the on-rush of said liquid.

10. The liquid disposal tool of claim 9 wherein said center taper is created by attaching stringers to fabric of said diffuser sheet with one of ultra-violet light (UV) activated adhesives, hot melt glues, or contact adhesives.

11. The liquid disposal tool of claim 1 wherein said absorbent further comprises oil eating microbes.

12. The liquid disposal tool of claim 1 wherein said container is made of the same material as said insert tray.

13. The liquid disposal tool of claim 1 wherein said set of conical depressions have slits or holes.

14. The liquid disposal tool of claim 1 wherein said insert tray further comprises:
    an upper rim that extends above said flat top pedestals and defines a collection volume between said diffuser sheet and said flat top pedestals.

15. The liquid disposal tool of claim 1 wherein said insert tray further comprises:
    a lower rim that extends below said conical depressions and defines an area to place the absorbent between said bottom portion and said insert tray.

16. The liquid disposal tool of claim 1 wherein the liquid disposal tool is a disposable oil change kit (DOCK) that collects dirty oil during an engine oil change.

17. A liquid disposal tool for the collection and disposal of liquids comprising:
    an under tray;
    an absorbent resting on said under tray, said absorbent configured to collect said liquid;
    an insert tray covering or supporting said absorbent; and
    a diffuser sheet overlaying said insert tray, said diffuser sheet joined at a top portion of said insert tray.

18. The liquid disposal tool of claim 17 wherein said absorbent further comprises at least one of sawdust, corncob, cat litter or a polyalkylenes.

19. The liquid disposal tool of claim 17 wherein said absorbent is a peat moss that has been specially processed and is capable of absorbing liquids with total encapsulation.

20. The liquid disposal tool of claim 17 wherein said under tray is made of materials comprising paper, cardboard, plastic, oriented strand board (OSB), sugar cane, and composite material containing any of the aforementioned.

* * * * *